April 30, 1929.　　L. BLACKMORE ET AL　　1,711,011
BRAKE
Filed May 21, 1923　　2 Sheets-Sheet 1
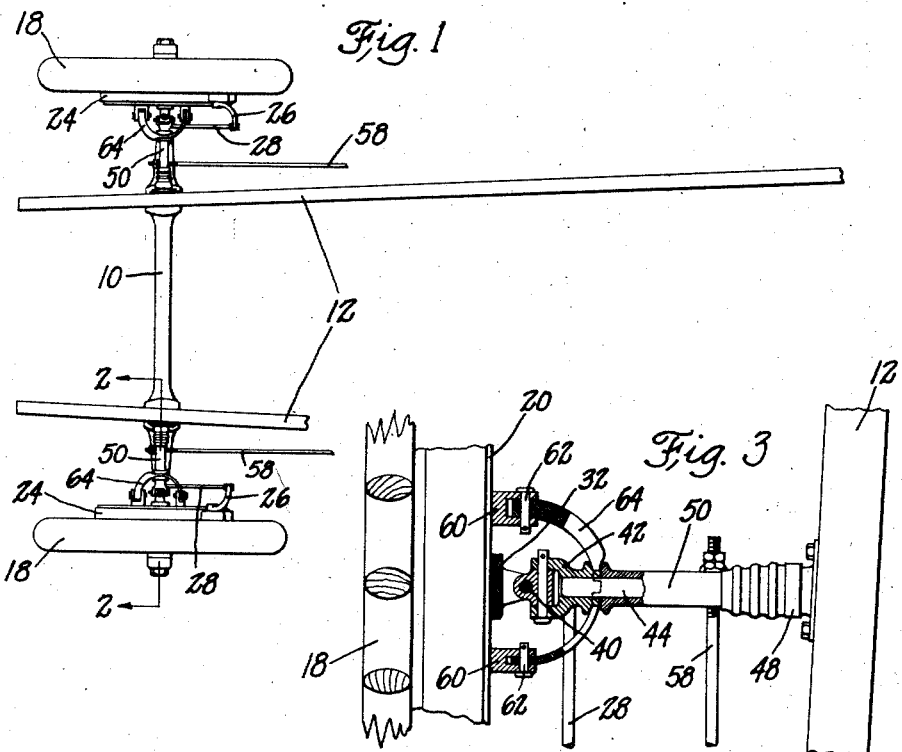
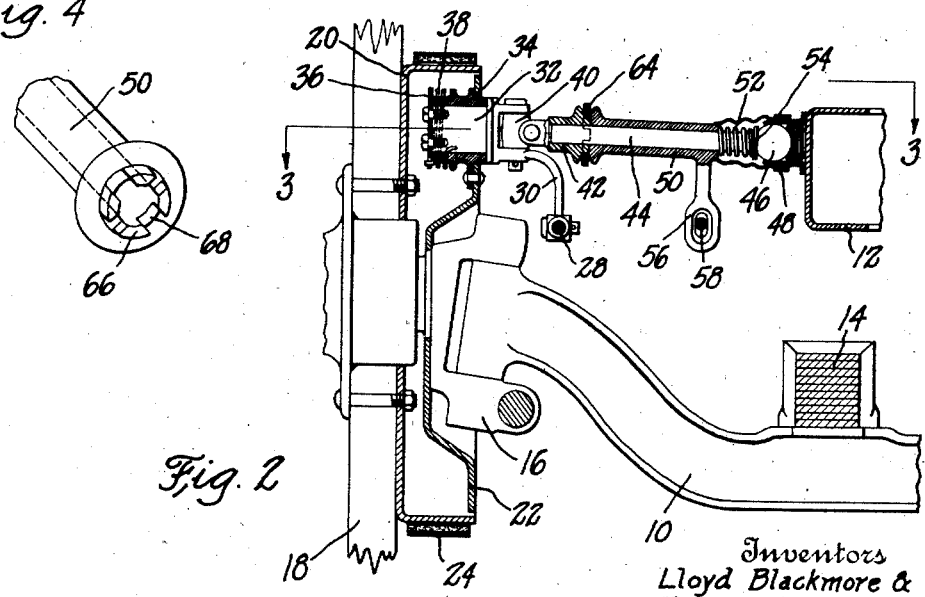
Inventors
Lloyd Blackmore &
Fred E. Jones
By their Attorneys April 30, 1929.  L. BLACKMORE ET AL  1,711,011
BRAKE
Filed May 21, 1923  2 Sheets-Sheet 2
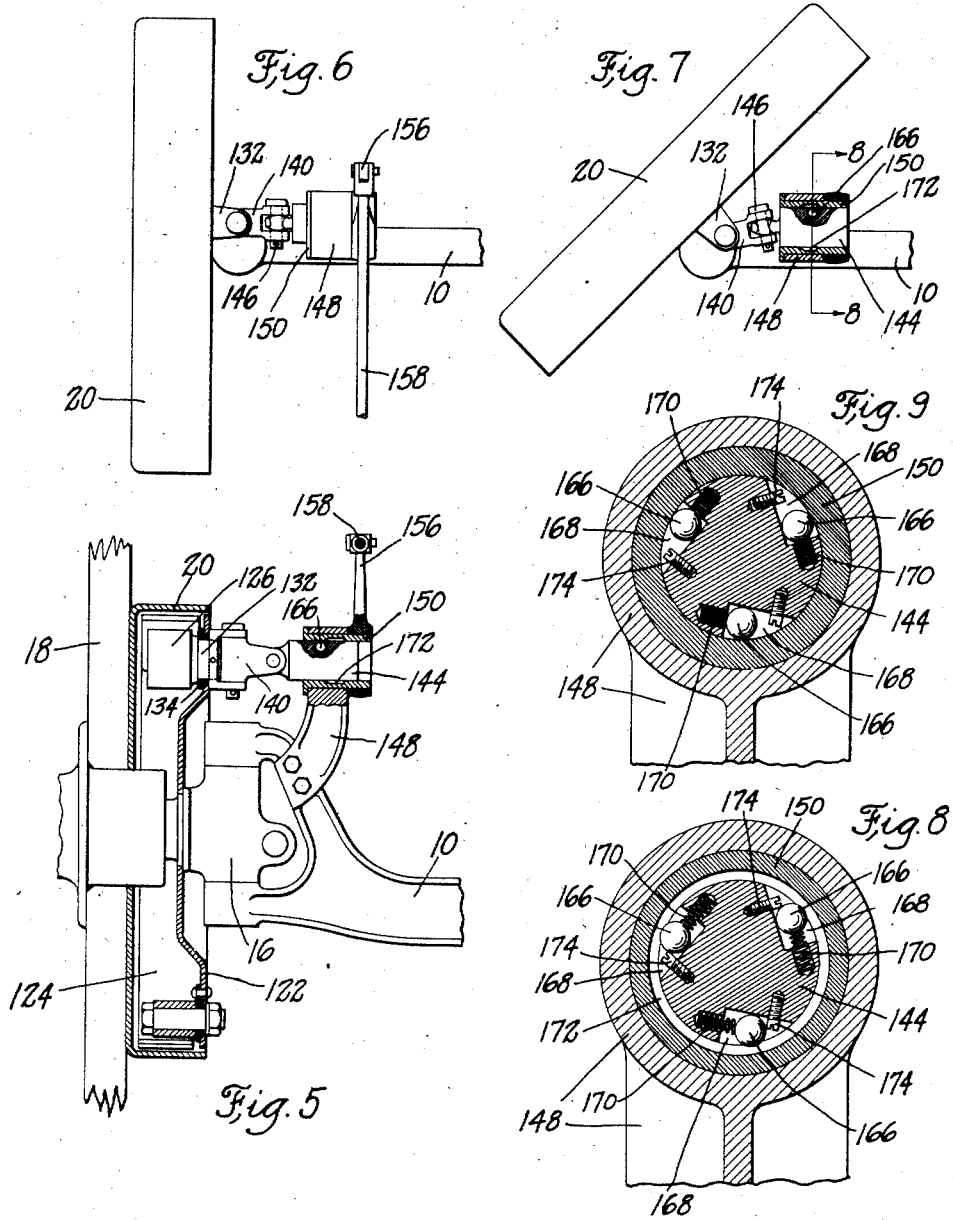
Inventors
Lloyd Blackmore &
Fred E. Jones
By their Attorneys Patented Apr. 30, 1929.

1,711,011

UNITED STATES PATENT OFFICE.

LLOYD BLACKMORE, OF HIGHLAND PARK, AND FRED E. JONES, OF DETROIT, MICHIGAN, ASSIGNORS TO GENERAL MOTORS CORPORATION, OF DETROIT, MICHIGAN, A CORPORATION OF DELAWARE.

BRAKE.

Application filed May 21, 1923. Serial No. 640,575.

This invention relates to brakes, especially but not necessarily those intended for use on vehicles such as automobiles, and is illustrated as embodied in a set of such brakes which operate differently when the vehicle is rounding a corner than when the vehicle is running straight ahead.

One manner of increasing the effect of brakes for automobiles and other vehicles, to provide for properly controlling these vehicles in spite of the constant increase in weight and speed, is by providing brakes on all four of the wheels. When this is done, however, at least by the use of most of the brakes with which we are familiar, there is greatly increased danger of skidding due to locking the front wheels, which may at times be very dangerous in rounding a corner. This is for the reason that it is impossible to steer the vehicle unless the steering wheels are actually turning, and therefore if these wheels are locked the vehicle may skid straight ahead instead of rounding the corner, especially if the road be slippery with ice or by reason of a wet pavement.

In order to avoid this danger by making sure that at least one wheel will always be turning in rounding a corner, our invention contemplates the use of brakes on the steering wheels so arranged that one or both will be positively disconnected from the brake operating connections in rounding a corner. This is especially advantageous in certain forms of brakes which have been in long and successful use on the driving wheels, but which would otherwise have to be adjusted to exert a comparatively small retarding force on the front wheels. That is to say, with our invention it is not necessary to adjust the front wheel brakes to apply less retarding force than the rear wheel brakes, as would otherwise be necessary to avoid skidding as far as possible, in adapting for use on the front wheels most of the types of brakes which are in use for the rear wheels.

One form of brake operating connections which is especially useful on the front wheels of a vehicle in securing the above explained object includes a brake-operating part and a driver-controlled part which are automatically connected and disconnected simultaneously with swivelling movement of the wheel on which the brake acts. Preferably these parts are provided with cooperating clutch members arranged to be engaged and disengaged by this swivelling movement of the wheel and which are arranged to engage one another automatically in a predetermined initial position when the brakes are released.

One modification of the invention comprises a universally jointed brake operating connection supported by the chassis frame, thus reducing to a minimum the weight of the unsprung parts. This connection includes relatively movable clutch members controlled by swivelling movement of the wheel, as for example by a member carried by the knuckle of the wheel and arranged to be moved by swivelling movement of the knuckle to wedge the clutch members apart to disconnect the brake when rounding a corner. In the embodiment illustrated in the drawings this member is in the form of a semi-circular slotted cam having a lower portion which permits the clutch members to engage and a higher portion which wedges them apart and which is arranged to disconnect the brake only when the corresponding wheel is on the outer side of the turn.

In another modification selected for illustration, the driver controlled part is mounted on the axle, and is shown as being a sleeve slidingly receiving a brake operating shaft the other end of which is supported at one side of the swivelling axis of the wheel, so that swivelling movement of the wheel imparts an axial component of motion to the shaft. Preferably there is a clutch for connecting and disconnecting the shaft and sleeve according to the axial position of the shaft. In the form shown in the drawings this clutch is in the form of a free wheel ball or roller clutch which normally connects the shaft and sleeve but which in one axial position of the shaft registers with an internal groove in the sleeve so that the shaft and sleeve are disconnected.

The above and other objects and features of the invention, including various novel combinations of parts and desirable particular constructions, will be apparent from the following description of two illustrative embodiments of the invention shown in the accompanying drawings, in which:

Figure 1 is a top plan view of part of the chassis of an automobile equipped with brakes according to the first modification of the invention;

Figure 2 is a view on the line 2—2 of Figure 1 showing one of the brakes and the associated parts of the chassis partly in rear elevation and partly in transverse vertical section;

Figure 3 is a view on the line 3—3 of Figure 2 showing the brake operating connections partly in top plan and partly in horizontal section;

Figure 4 is a perspective view of one of the clutch members of the brake operating connections of Figures 1, 2 and 3;

Figure 5 is a view corresponding to Figure 2 but showing a second modification of the invention, with some of the parts in rear elevation and others in transverse vertical section;

Figure 6 is a top plan view of the parts shown in Figure 5;

Figure 7 is a view corresponding to Figure 6 but with some of the parts broken away and with the wheel in the position which it occupies when it is on the outer side of a turn;

Figure 8 is a section on the line 8—8 of Figure 7 showing the free wheel clutch between the driver controlled sleeve and the operating shaft in the position which it occupies when the wheel is on the outer side of the turn; and Figure 9 is a view of the same parts as shown in Figure 8 when they are in their normal positions with the sleeve and shaft clutched together to operate the brake.

In the modification shown in Figures 1 to 4 there is an axle 10 supporting a chassis frame 12 through the medium of springs 14, and to which are swivelled a pair of knuckles 16 on which are rotatably mounted wheels 18, each of which is provided with a brake drum 20. Each knuckle 16 carries a supporting plate 22, shown as being welded thereto, and which supports a brake device which may be, and which is shown as being, an external band 24 arranged to be contracted and expanded by a device operated by rocking an arm 26 connected by a link 28 to an operating arm 30. The arm 30 is integral with or secured to the forked end of a shaft 32 journaled in a bushing 34 carried by the plate 22, the shaft 32 carrying an outer disk 36 connected to the bushing 34 by a torsion spring 38 which also serves as a compression spring urging the disk 36 toward the left in Figure 2 to hold the shaft 32 yieldingly but firmly in place. The idle position of shaft 32, when the brakes are released, is determined by a finger turned down from the disk 36 into an arcuate notch in the edge of the bushing 34. The shaft 32 is connected by a universal joint 40, which is in alinement with the swivelling axis of the knuckle 16, to a sleeve or socket 42 which slidingly receives a shaft 44, the head of which is formed into a ball 46 received in a socket 48 carried by the chassis frame 12. In this manner the shaft 44 is universally supported by the frame 12.

The parts described above, except as hereinbefore noted, may be, and are shown as being, as the same construction as those described and claimed in an application of F. A. Bower, Ser. No. 677,001 for "vehicle brakes" filed November 26, 1923 and in a patent to C A. Boom 1,557,969 for "motor vehicles" dated October 20, 1925, and which are assigned to the assignee of this application.

According to the present invention the sleeve 42 is formed at its end as one member of a clutch, the other member of which is formed on the end of a sleeve 50 slidably mounted on the shaft 44. The sleeve 50 is constantly urged toward the left in Figures 2 and 3 by a coil spring 52 engaging a collar or washer 54 held by the ball end 46 of the shaft 44. An arm 56 integral with or secured to the sleeve 50 is shown as being slotted to receive the end of a link 58 connected in any suitable manner to the brake pedal or to any equivalent driver-controlled device.

In order to control the engagement and disengagement of the clutch members 42 and 50 according to the angular position of the knuckle 16, plate 22 is provided with a pair of forked lugs 60 connected by horizontal pivots 62 to a semi-circular cam member 64 slotted throughout most of its length to straddle the shaft 44 and having a low or thin portion shown at the bottom in Figure 3 which permits engagement of the clutch members and a high or wedging portion shown at the top in Figure 3 which is thick enough to wedge the clutch members apart against the resistance of the spring 52. The horizontal pivots 62 permit the cam member 64 to swing up and down when the brake connections move up and down to follow the relative movement of the chassis frame 12 and the axle 10 due to the springs 14, but force the cam to accompany the knuckle in its swivelling movements due to manipulation of the steering wheel.

Thus in the particular arrangement shown in the drawings, and assuming that the brake pedal has been depressed, the band 24 will be contracted into frictional engagement with the drum 20 as long as the vehicle is moving straight ahead or when it is turning to the left (Figures 2 and 3), that is when the wheel illustrated in Figures 2 and 3 is the inner wheel. If, however, the steering wheel is manipulated while the pedal is still depressed to turn the vehicle to the right, the cam member 64, which has its center substantially in the swivelling axis of the knuckle 16, will accompany the knuckle in its movement and will wedge the clutch members 42 and 50 apart so that the brake will automatically be released. At this time the wheel shown in Figures 2 and 3 is the outer wheel. By this arrangement there is never any braking action on the outer wheel on a turn and there is practically no chance that this wheel will stop turning and allow the vehicle to skid straight ahead instead of safely rounding the turn.

In the particular form of the clutch shown in the drawings each member 42 and 50 has teeth 66 arranged to seat in corresponding depressions 68 in the other member. As the arm 56 never moves as much as 90°, after the clutch members are disengaged they will remain disengaged with the teeth riding on the ends of the teeth of the opposite clutch member, until such time as the brake pedal is released, when the spring 38 and the usual return spring on the pedal will return all the parts to their initial positions with the teeth 66 seated in the depressions 68 (unless prevented by the higher portion of the cam 64.)

In the modification shown in Figures 5 to 9 the knuckle 16 carries a plate 122, corresponding to the plate 22, which supports a pair of internal expanding shoes 124 operated by a cam 126 carried by a short shaft 132 journaled in a bushing 134 carried by plate 122. In this case, however, the shaft 132 does not intersect the swivelling axis of the knuckle 16, but, as will be apparent from Figures 6 and 7, is spaced a short distance ahead of this axis. The shaft 132 is formed in its nearest end with a pair of arms embracing a universal joint 140, the axis of which is normally directly ahead of the swivelling axis of the knuckle 16 as shown in Figure 6. The joint member 140 is forked to embrace a rounded projection from a rock shaft 144 to which it is connected by a horizontal pivot pin 146 in such a manner as to form, for all purposes of manipulation of the brake, a second universal joint.

The shaft 144 is slidably received in a sleeve 150 held in a bearing formed in the upper end of an arm 149 secured to the axle 10. The sleeve 150 is connected by an arm 156 and a link 158 to the brake pedal or an equivalent driver-controlled device.

In the normal position shown in Figures 5, 6 and 9, the shaft 144 is clutched to the sleeve 150, in such a manner as to be operated thereby, by means of balls or rollers 166 held in wedge shaped depressions 168 formed in the shaft 144 in such a manner as to constitute a "free wheel" or "Horton" clutch. The balls or rollers 166 are wedged outwardly into clutching engagement with the sleeve 150 by their springs 170 in the manner usual with clutches of this type. When the shaft 144 is moved axially by the swivelling of its wheel on the outer side of a turn, as shown in Figure 7, the balls or rollers 166 are, however, moved into positions where they register with an internal groove 172 formed in the sleeve 150 so that the shaft 144 and the sleeve 150 are disconnected. The outward movement of the balls or rollers in this position, as shown in Figure 8, is limited by stops 174.

In the operation of this modification, manipulation of the brake pedal when the wheel is in the position in Figures 5, 6 and 9 will apply the brake by reason of the fact that in this position the sleeve 150 is clutched to the shaft 144 by the balls or rollers 166. If, however, the steering wheel is manipulated to move the wheel to the position shown in Figure 7, the balls or rollers 166 are moved, by the axial motion of shaft 144 due to the forward offset position of shaft 132, into registration with the groove 172 to release the shaft 144 and therefore to release the brake. If the steering wheel is again manipulated to return the wheel to the position shown in Figures 5, 6 and 9 before the brake pedal is released, the sleeve 150 and the shaft 144 will be clutched to one another in a new position of relative angular adjustment, so that if the brake pedal is further depressed the two front wheel brakes will operate differently. When the brake pedal is released, however, due to the "free wheel" construction, all of the parts return to their initial position with the shafts 144 again clutched to the sleeves 150 in their original positions of relative angular adjustment.

While two illustrative embodiments of our invention have been explained above it is not our intention to limit its scope to these embodiments or otherwise than by the terms of the appended claims.

We claim:

1. A vehicle comprising, in combination, a pair of swivelled steering wheels, a brake for each of said wheels, and means operated by swivelling movement of the wheels to disconnect and render one of said brake operating means inoperative upon its brake.

2. A vehicle comprising, in combination, a pair of swivelled steering wheels, a brake for each of said wheels, mechanical connections including a clutch for each brake to operate the brakes, and a device associated with each wheel and operated by swivelling movement of the wheel to open the corresponding clutch to render the brake inoperative.

3. A vehicle comprising, in combination, a pair of mechanical connections for operating the brakes including a clutch associated with each brake, and means for swivelling the wheels to steer the vehicle and for simultaneously disengaging the clutch on the outer side of the turn to render the outer brake inoperative without affecting the inner brake.

4. A vehicle comprising, in combination, a pair of steering wheels, a brake for each wheel, a rock member for operating each brake, and means operated by swivelling movement of each wheel for disengaging one rock member from its brake.

5. A vehicle comprising, in combination, a pair of steering wheels, a brake for each wheel, a rock member for operating each brake, and means for disengaging each brake from its rock member when its wheel is on the outer side of the turn without affecting the brake when the wheel is on the inner side of the turn.

6. A vehicle which has a fixed axle, a knuckle swivelled on the axle, and a wheel rotatably mounted on the knuckle, and which comprises, in combination, a drum carried by the wheel, retarding means carried by the knuckle in position to cooperate with said drum, a connection for operating said retarding means, and means operated by relative angular movement of the knuckle and axle to disconnect said connection from the retarding means.

7. A vehicle which has a fixed axle, a knuckle swivelled on the axle, and a wheel rotatably mounted on the knuckle, and which comprises, in combination, a drum carried by the wheel, retarding means carried by the knuckle and cooperating with said drum, a brake operating member, a clutch connecting said member to the retarding means, and means operated by relative angular movement of the knuckle and axle to disengage the clutch.

8. A vehicle which has a fixed axle, a knuckle swivelled on the axle, and a wheel rotatably mounted on the knuckle, and which comprises, in combination, a drum carried by the wheel, retarding means carried by the knuckle in position to cooperate with said drum, a rock member for operating said means, a substantially coaxial rock member for operating the first rock member, a clutch for connecting the two rock members, and means operated by relative angular movement of the knuckle and axle for disengaging the clutch.

9. A vehicle which has a fixed axle, a knuckle swivelled on the axle, and a wheel rotatably mounted on the knuckle, and which comprises, in combination, a drum carried by the wheel, an expansible and contractable brake device carried by the knuckle in position to be brought into frictional engagement with the drum, a rock member for expanding and contracting said device, an operating member, a clutch for connecting the rock member and the operating member, and a device operated by relative angular movement of the knuckle and axle for disengaging the clutch.

10. A vehicle which has a fixed axle, a knuckle swivelled on the axle, and a wheel rotatably mounted on the knuckle, and which comprises, in combination, a drum carried by the wheel, a cooperating brake device carried by the knuckle, an operating member for said device carried by the knuckle at one side of its connection to the axle in such a manner that said member has a component of motion parallel to the axle when the knuckle is swivelled on the axle, a second operating member supported against movement with the knuckle, and means for connecting said members when the knuckle is in one angular position with respect to the axle and for disconnecting them when the knuckle is in a second angular position.

11. A vehicle which has a fixed axle, a knuckle swivelled on the axle, and a wheel rotatably mounted on the knuckle, and which comprises, in combination, a drum carried by the wheel, a cooperating brake device carried by the knuckle, an operating member for said device carried by the knuckle at one side of its connection to the axle in such a manner that said member has a component of motion parallel to the axle when the knuckle is swivelled on the axle, a second operating member supported against movement with the knuckle, and a clutch operated by said component of motion parallel to the axle to connect and disconnect said members.

12. A vehicle which has a fixed axle, a knuckle swivelled on the axle, and a wheel rotatably mounted on the knuckle, and which comprises, in combination, a drum carried by the wheel, a cooperating brake device carried by the knuckle, an operating member for said device carried by the knuckle at one side of its connection to the axle in such a manner that said member has a component of motion parallel to the axle when the knuckle is swivelled on the axle, a second operating member supported against movement with the knuckle, and means operated by the component of motion parallel to the axle for connecting and disconnecting the brake operating member and the brake device.

13. A vehicle which has a fixed axle, a knuckle swivelled on the axle, and a wheel rotatably mounted on the knuckle, and which comprises, in combination, a drum carried by the wheel, a cooperating brake device carried by the knuckle, an operating rock sleeve carried by the axle, a brake operating shaft slidingly received in the sleeve and supported by the knuckle at one side of the axis of its connection with the axle in such a manner that the shaft has an axial component of motion when the wheel is swivelled on the vehicle, and means operated by the sliding of the shaft in the sleeve for connecting and disconnecting the shaft and sleeve.

14. A vehicle comprising, in combination, an axle, a spring supported frame above the axle, a pair of steering wheels swivelled to the axle, a brake associated with each wheel, operating connections for each brake including a universally mounted rock shaft supported by said frame, and means for connecting and disconnecting the shaft and the brake according to the angular position of the corresponding wheel.

15. A vehicle comprising, in combination, an axle, a spring supported frame above the axle, a pair of steering wheels swivelled to the axle, a brake for each wheel, a universally jointed operating connection for each brake supported by the frame, said connection comprising a clutch for connecting and disconnecting it and its brake, and means operated by swivelling movement of the corresponding wheel for engaging and disengaging the clutch.

16. A vehicle comprising, in combination, an axle, a spring supported frame above the axle, a pair of steering wheels swivelled to the axle, a universally jointed operating connection for each brake supported by the frame, each of said connections including relatively movable clutch members for connecting and disconnecting the operating connection and its brake, and a cam moved by swivelling movement of the corresponding wheel to wedge each set of clutch members apart.

17. A vehicle comprising, in combination, an axle, a spring supported frame above the axle, a pair of knuckles swivelled to the axle, a wheel having a brake drum rotatably mounted on each knuckle, a brake device supported by each knuckle in cooperative relation to the corresponding drum, a universally jointed operating shaft for each brake device supported by the frame, a pair of clutch members carried by each shaft and arranged to connect and disconnect the shaft and the corresponding brake device, and a cam carried by each knuckle and operated by swivelling movement thereof to wedge the clutch members apart.

18. A vehicle comprising, in combination, an axle, a spring supported frame above the axle, a pair of knuckles swivelled to the axle, a wheel having a brake drum rotatably mounted on each knuckle, a brake device supported by each knuckle in cooperative relation to the corresponding drum, a universally jointed operating shaft for each brake device supported by the frame, a pair of clutch members carried by each shaft and arranged to connect and disconnect the shaft and the corresponding brake device, and a semi-circular cam member supported by each knuckle with its center substantially at the swivelling axis of the knuckle and arranged to be operated by swivelling movement of the knuckle to wedge the clutch members apart.

19. A vehicle comprising, in combination, an axle, a spring supported frame above the axle, a pair of knuckles swivelled to the axle, a wheel having a brake drum rotatably mounted on each knuckle, a brake device supported by each knuckle in cooperative relation to the corresponding drum, a universally jointed operating shaft for each brake device supported by the frame, a pair of clutch members carried by each shaft and arranged to connect and disconnect the shaft and the corresponding brake device, and a semi-circular cam member carried by each knuckle and having a slot arranged to straddle the shaft between the clutch members, the cam member having a low section which permits engagement of the clutch members and a wedging higher section at one side of the shaft which is operated by swivelling movement of the knuckle to wedge the clutch members apart.

20. A vehicle comprising, in combination, an axle, a spring supported frame above the axle, a knuckle swivelled on the axle, a wheel having a brake drum rotatably mounted on the knuckle, an expansible and contractable brake device carried by the knuckle for frictional engagement with the drum, and connections for operating said device including a pair of telescopically connected rock members, one of which is supported by the knuckle and has a universal joint in alinement with the swivelling axis of the knuckle, and the other of which is universally mounted on the frame, the end of the outer one of said members being in the form of one member of a clutch, a second clutch member slidably mounted on the other of said rock members and arranged to be operated by the driver, and an arcuate cam carried by the knuckle which has a slot and which is arranged to straddle one of the rock members between the two clutch members and which has a lower portion permitting the clutch members to engage and a higher portion wedging them apart, and a spring urging the clutch members into engagement with one another.

21. A vehicle comprising, in combination, a road wheel, a brake effective to retard motion of the wheel, driver-controlled means for applying the brake, and driver-controlled means for steering the vehicle and connecting and disconnecting the brake and its applying means.

22. A vehicle comprising, in combination, a road wheel, a brake for said wheel, connections for applying the brake, clutch members through which the connections operate, and vehicle-steering means arranged to engage and disengage the clutch members with each other.

23. A vehicle comprising, in combination, a road wheel, a brake therefor, connections to operate the brake, vehicle-steering means, and means operated by the steering of the vehicle to disconnect the brake and connections when the wheel is on the outer side of a turn.

24. Retarding mechanism comprising, in combination, a brake, operating connections therefor, clutch members through which the connections operate, means to disengage the clutch members, and means to re-engage the clutch members in predetermined positions.

25. Retarding mechanism comprising, in combination, a brake, operating connections therefor, clutch members through which the connections operate, means to disengage the clutch members, means to determine the initial positions of the clutch members, and spring means to return them to their initial positions and cause them to re-engage.

26. Retarding mechanism comprising, in combination, a brake, operating connections therefor, a pair of clutch members connecting the brake and the operating connections, said members having intermeshing teeth and depressions which engage in only one angular position within an arc of ninety degrees, means to determine the said angular position of said members, means to disengage the clutch members, and spring means to return them to said angular position and cause them to re-engage.

In testimony whereof we affix our signatures.

LLOYD BLACKMORE.
FRED E. JONES.